June 20, 1967 M. J. RHUDE 3,325,934
PORTABLE DISPLAY CASES
Filed Aug. 25, 1965 2 Sheets-Sheet 1
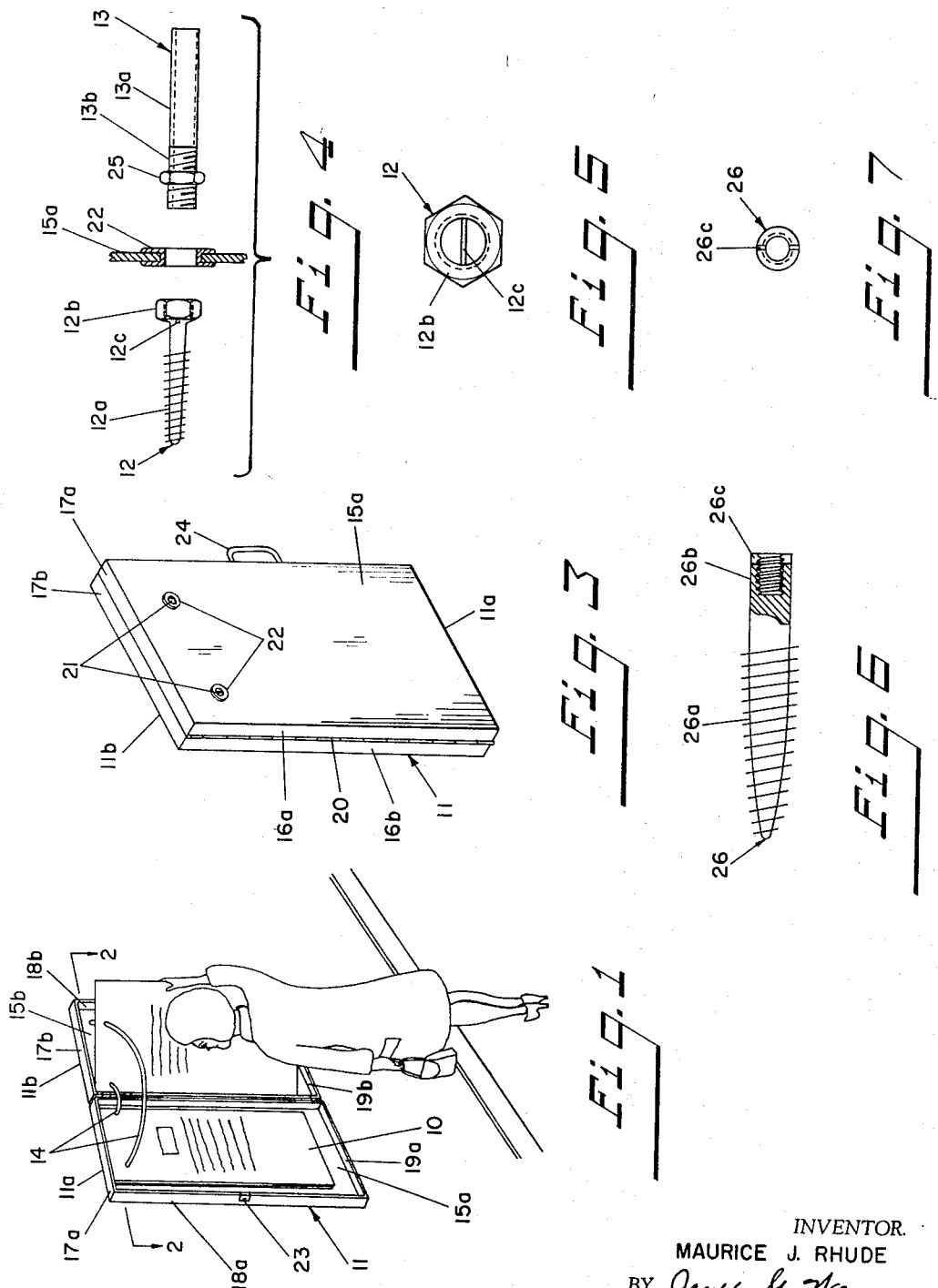
INVENTOR.
MAURICE J. RHUDE
BY Joseph G. Werner
ATTORNEY

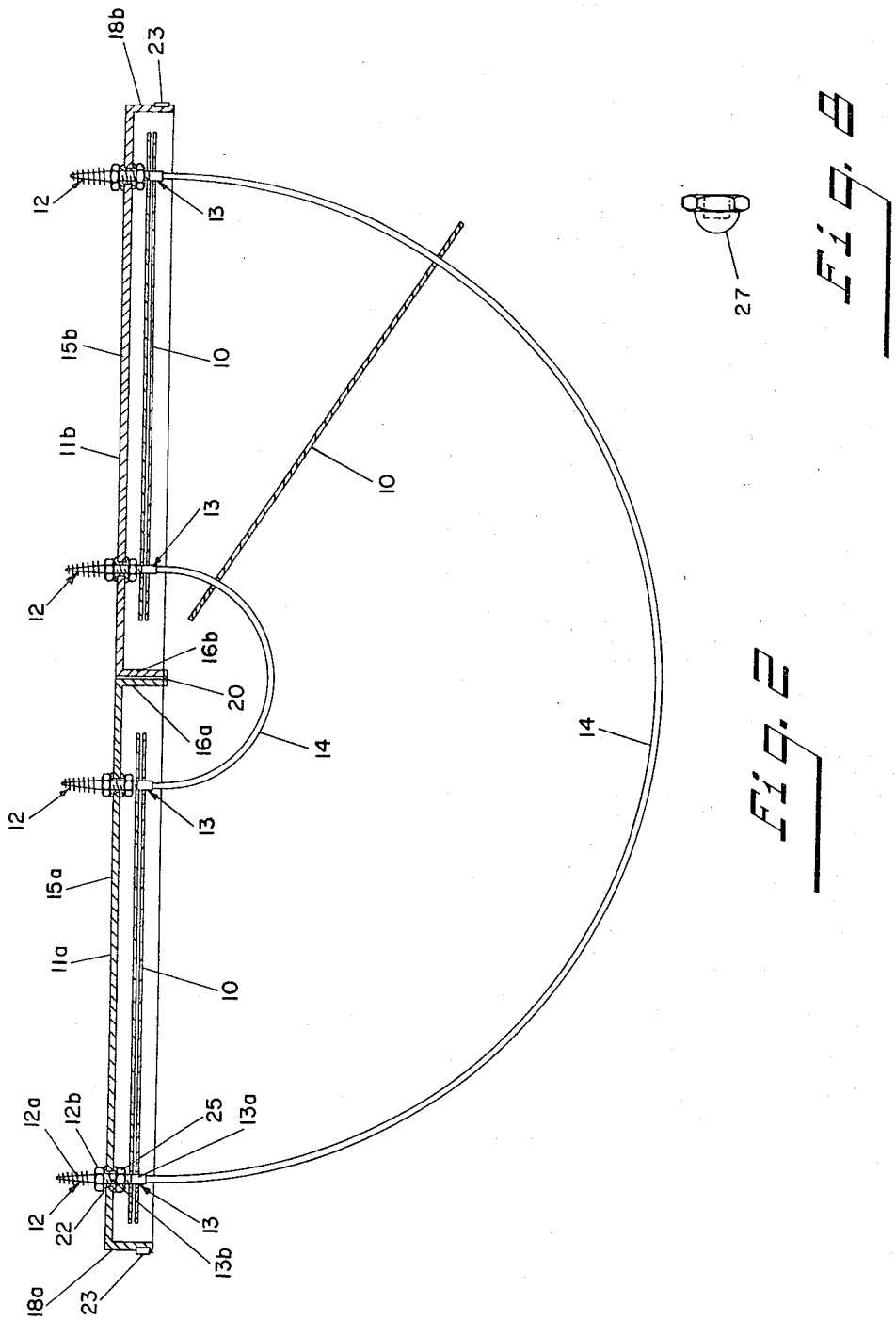

United States Patent Office 3,325,934
Patented June 20, 1967

3,325,934
PORTABLE DISPLAY CASES
Maurice J. Rhude, Oakwood Road,
Marinette, Wis. 54143
Filed Aug. 25, 1965, Ser. No. 482,573
12 Claims. (Cl. 40—102)

ABSTRACT OF THE DISCLOSURE

A portable attaché case having a pair of hingedly connected case sections pivotable from a closed storage and transportation position to an open position for displaying sheets of visual aid materials therein. The case sections are mounted on a wall by four externally threaded shafts which may be turned in flush with a vertical wall surface. Each of the shafts has an internally threaded female portion for receiving externally threaded tubular support members which extend through the case sections into the shafts. Two semi-circular curved rods of different lengths are inserted into the tubular support members and the visual aid sheets are supported on the rods and can be transferred from one case section to the other by sliding the sheets along the transfer rod.

---

This invention relates to portable cases and more particularly to portable cases for storing, transporting and displaying visual aid materials and the like.

In the past, devices for displaying visual aid materials have not been used for storing and transporting materials as well as for displaying the materials. Known display devices such as easels, tripods and permanently installed glass showcases cannot be used to store and transport visual aid material when the material is not in use. Furthermore, easels and tripods are cumbersome and difficult to transport from place to place and they cannot be hung from a wall or similar supporting surface and are, therefore, space taking devices on the floor of the office, conference room, museum, classroom, exhibit hall or other area where one may desire to display visual aid materials.

My new and improved portable display case has a variety of uses in education, industry, business, recreation, the home and elsewhere. For example, in school, the use of visual aid materials such as diagrams, charts, maps and so forth are often a necessity for proper classroom instruction. With my new and improved portable display case, the visual aid materials which are germane to a particular subject or area of study may be kept together in one of my portable cases and displayed in the classroom during the discussions devoted to that subject. When the subject has been covered, the case may be closed and locked and the visual aid materials may thus be stored out of view in a safe and orderly fashion in the case while it is mounted on the wall of the classroom until the subject is again discussed the following term.

My portable display case is also particularly useful in presenting ideas and reports at business conferences, advertising in a booth at a convention, exhibiting a stamp collection or a coin collection and the like, exhibiting such things as newspapers and documents in a museum. These are but a few of a wide variety of uses for which my portable display case is particularly well suited.

It is a primary object of my invention to provide a new and improved portable case for storing, transporting and displaying visual aid materials and the like in a convenient manner.

It is a further object of my invention to provide a portable display case which may be easily attached to a wall or similar supporting surface in an open position for displaying the materials therein.

It is a still further object of my invention to provide a portable display case that is very durable in use yet light in weight and may be quickly and easily disconnected from a wall or similar supporting surface.

It is another object of my invention to provide a portable display case having new and improved fastening means for attaching the case to a wall or similar supporting surface.

Another object of my invention is to provide a new and improved portable case having a pair of case sections adapted to be swung from a closed storage and transportation position to an open position for displaying the materials therein and having means for transferring said materials from one case section to the other in said open position.

Other objects, features and advantages of this invention will be apparent from the following detailed description taken in conjunction with the accompanying drawings wherein preferred embodiments of the principles of my invention have been selected for exemplification.

In the drawings:

FIG. 1 is a perspective view showing my portable display case attached to a wall in open position for displaying the material therein.

FIG. 2 is an enlarged sectional view taken along section line 2—2 of FIG. 1.

FIG. 3 is a perspective view showing my portable display case in a closed position.

FIG. 4 is an exploded view, partially in section, showing one embodiment of the fastening and supporting means for my portable display case.

FIG. 5 is an end view of the fastening means of FIG. 4.

FIG. 6 is a side view, partially in section, showing a second embodiment of the fastening means for my display case.

FIG. 7 is an end view of the fastening means of FIG. 6.

FIG. 8 is a side view of a cap nut which may be used in connection with my display case.

Referring more particularly to the drawings wherein like numerals refer to like parts throughout the several views it will be seen that my portable display case 11 comprises a pair of hingedly connected case sections 11a and 11b, fastening means 12 for attaching the case sections 11a and 11b to a wall or similar supporting surface, supporting means 13 extending through the case sections 11a and 11b for holding visual aid material 10, and means such as rods 14 for transferring the visual aid material 10 from one case section to the other.

Case sections 11a and 11b have substantially flat wall portions 15a and 15b, respectively, and four adjoining perpendicular sides 16a and 16b, 17a and 17b, 18a and 18b, and 19a and 19b, respectively. The two case sections 11a and 11b are joined together along the edges of sides 16a and 16b by hinge means 20. The hinge 20 permits each case section to be swung 180° with respect to the other, thus, permitting the case 11 to be opened to the position shown in FIGS. 1 and 2 for displaying the material 10 therein.

The flat wall portions 15a and 15b are of substantially equal size so that the four adjoining sides of case sections 11a and 11b coincide when the case sections are swung to a closed position, thus, forming a closed case for storing and transporting the material 10 therein.

When the two case sections 11a and 11b are in a closed position with respect to each other they may be securely held in this position by a conventional key operated lock 23 or other fastening means. For ease of transporting the case when in a closed position a handle 24 may be provided as shown in FIG. 3.

The case sections 11a and 11b may be made of wood, metal, plastic, or any other suitable material which is substantially rigid, yet, relatively light in weight. The material should have sufficient strength to permit the case 11 to be hung from a wall or similar supporting surface. Various forms of vinyl plastic or other decorative coatings may be added to the case sections 11a and 11b to increase the durability and attractiveness of the case.

As best seen in FIGS. 1–4 side walls 15a and 15b of case sections 11a and 11b, respectively, each has a pair of holes 21 therethrough. Metal eyelets 22 may be attached in holes 21 for protecting the edges of the holes.

The fastening means 12, as shown in FIGS. 2, 4 and 5, are provided for attaching the case sections 11a and 11b to a wall or other substantially upright supporting surface. Fastening members 12 comprise an externally threaded male shaft 12a and an internally threaded hollow female portion 12b. The hollow female portion 12b has a recess such as slot 12c therein for reciving a turning tool such as a screw driver (not shown) for turning the threaded shaft portion 12a of the fastening means 12 into a support wall. By having the tool receiving recess 12c within the female portion 12b the fastening means 12 may be turned all of the way into a supporting wall so as to be flush with the surface of the wall. This presents a safe, non-protruding, neat appearing fastening means which may be permanently attached to the supporting wall.

Referring now to FIGS. 2 and 4, the supporting means 13 comprises a tubular portion 13a having an externally threaded portion 13b thereon. Supporting member 13 may have a nut 25 threaded on portion 13b. The externally threaded portion 13b of the support members 13 is adapted to be inserted through the eyelet 22 and turned into the internally threaded female portion 12b of the fastening member 12. The nut 25 which is threaded on portion 13b of the supporting member 13 for accommodating case walls of various thicknesses may then be turned into engagement with the eyelet 22 for securely holding the case sections 11a and 11b against the supporting wall. As best seen in FIGS. 1 and 2 the visual aid material 10 is supported on the supporting members 13 for display.

As best shown in FIG. 2, the supporting means 13 are preferably symmetrically located about the edges of the case sections 11a and 11b and in order not to obstruct the closing of the display case 11, the supporting members 13 extend inwardly of the case walls 15a and 15b slightly less than the sides 16a–19a and 16b–19b. When the case 11 is removed from the supporting wall, if desired, a nut similar to nut 25, or other threaded fastener such as cap nut 27 shown in FIG. 8, may be placed on the externally threaded portion 13b of supporting member 13 for securing the supporting member 13 on the wall portions 15a and 15b of case sections 11a and 11b.

The hollow portion 13a of the supporting member 13 acts as a sighting means by which the fastening means 12 may be readilly located on the supporting wall. Otherwise, as in hanging a picture on the wall, there is difficulty in locating the picture hook since it is hidden from view behind the picture. Thus, my hollow supporting members 13 aid in locating the fastening members 12 and allow quick and easy attachment of the supporting members 13 to the fastening members 12.

As shown in FIG. 2, a pair of substantially semi-circular rods 14 are inserted into the hollow portions 13a of the supporting members 13. The rods 14 are preferably made of a substantially rigid metal such as steel, aluminum, or the like and may be solid or tubular. As shown in FIGS. 1 and 2, the visual aid material may be transferred from one case section to the other by merely moving the material 10 along the transfer rods 14. The rods 14 are frictionally held in the support members 13 and may be pulled out of members 13 when case 11 is to be closed. The semi-circular transfer rods may be stored and carried about in the case 11 when not in use. The rods 14 should be similarly curved so that the distance between the two rods is equal at all points along the length thereof so that the visual aid material 10 may be freely moved from one case section to the other without binding.

The use of transfer rods 14 permits viewing of both sides of the visual aid material 10 because as the material is transferred from one case section to the other it is turned 180°.

A modified form of fastening means is shown at 26 in FIGS. 6 and 7. The fastening means 26 comprises an externally threaded male shaft portion 26a and an internally threaded female portion 26b. The female portion 26b is substantially the same diameter as the male shaft portion and has a recess such as slot 26c formed on the end thereof for receiving the blade of a turning tool such as a screw driver for turning the fastening means 26 into a support wall. Fastening means 26 has the advantage that it is not necessary to drill a counter-sink hole to allow it to be screwed all of the way into a wall so as to be flush with the surface of the wall.

If desired, translucent sheet material may be used to enclose and preserve such display material as charts, graphs, maps, old newspaper collections, paintings and the like. Such material may be inserted between two sheets of translucent material which may then be sealed to prevent the display material from being damaged.

The number of fastening members 12, supporting members 13 and curved rods 14 used in my display case 11 could, of course, vary depending on such factors as the size and weight of the case and visual aid material.

While four fastening members 12 are shown in FIG. 2, in certain instances it may be desirable to use only two of the fastening members 12, both positioned for attachment to a single case section such as 11b. The two supporting members 13 in the other case section 11a may be secured on the wall 15a of case section 11a by a pair of cap nuts 27, one of which is shown in FIG. 8. This allows the display case 11 to be closed and locked while on the supporting wall for safe keeping of the display materials 10 during the night time hours. The case 11 may easily be closed by first pushing the display materials 10 back onto the supporting members 13 and then pulling out and removing the transfer rods 14. The case section 11a, which is not secured to the supporting wall, may then be swung 180° into closed position against case section 11b and secured thereto by locking means 23.

It will be noted that when case 11 is in its closed and locked position on a supporting wall, the fastening members 12 are covered by the case itself so that they can not be removed.

It is to be understood that my invention is not confined to the particular construction and arrangement of parts herein illustrated and described, but embraces all such modified forms thereof as come within the scope of the following claims.

I claim:
1. A portable case for storing, transporting and displaying material therein, comprising:
   (a) a pair of hingedly connected case sections,
   (b) said case sections being swingable from a closed storage and transportation position to an open position for displaying the materials therein,
   (c) means for releasably attaching said case sections in said open position to a substantially upright supporting surface, and
   (d) first and second curved rods releasably attached to said means for supporting said material in said case sections when said case sections are in said open position, one of said rods being substantially longer than the other and being disposed outwardly thereof for transferring said material from one case section to the other along said rods.
2. The portable case as specified in claim 1 including a lock for securing said case sections in said closed position.
3. A portable case for storing, transporting and displaying material therein, comprising:

(a) a pair of hingedly connected case sections,
(b) said sections being swingable from a closed storage and transportation position to an open position for displaying the material therein,
(c) fastening means for attaching said case sections to a supporting surface in said open position,
(d) supporting means in said case sections for holding said material when said case sections are in said open position, and
(e) means connecting to said supporting means for transferring said material from one case section to the other.

4. The portable case as specified in claim 3 wherein said transfer means comprises at least one curved rod attached to said supporting means.

5. The portable case as specified in claim 3 including a lock for securing said case sections in said closed position.

6. A portable case for storing, transporting and displaying material therein, comprising:
(a) a pair of hingedly connected case sections,
(b) said sections being swingable from a closed storage and transportation position to an open position for displaying the material therein,
(c) supporting means in said case having an externally threaded shaft portion and a hollow portion,
(d) fastening means having an internally threaded portion for receiving the externally threaded shaft portion of said supporting means, and
(e) means received within the hollow portion of said supporting means for transferring said material from one case section to the other when said case sections are in said open position.

7. The portable case as specified in claim 6 wherein said fastening means has a threaded shaft and means for receiving a tool for turning said fastening means into a supporting surface.

8. The portable case as specified in claim 6 wherein said transfer means comprises at least one curved rod attached to said supporting means.

9. The portable case as specified in claim 6 including a lock for securing said case sections in said closed position.

10. Fastening means adapted to be fixedly attached in a supporting surface, comprising:
(a) an externally threaded shaft having an internally threaded hollow portion,
(b) means on said shaft for receiving a tool for turning said shaft into said supporting surface, and
(c) an externally threaded tubular support member threaded into the hollow portion of said shaft for supporting a rod therein.

11. Fastening means adapted to be fixedly secured to a supporting surface, comprising:
(a) a shaft having an externally threaded male portion and an internally threaded female portion,
(b) said female portion having a slot therein for receiving a screw driver for turning the externally threaded male portion of said fastening means into a supporting surface, and
(c) an externally threaded tubular support member threaded into the female portion of said shaft for receiving a rod therein.

12. A portable case for storing, transporting and displaying material therein, comprising:
(a) a pair of hingedly connected case sections,
(b) said sections being swingable from a closed storage and transportation position to an open position for displaying the material therein,
(c) two supporting members in each of said case sections for holding said material and having hollow portions extending into said case sections and externally threaded portions,
(d) at least two fastening members each having an externally threaded male portion, an internally threaded female portion for receiving the externally threaded portions of at least two of said supporting members and recesses in said female portions for receiving a tool for turning the externally threaded male portions of said fastening members into a supporting surface, and
(e) two substantially semi-circular curved rods each having its ends fitting within the hollow portions of two of said supporting members for transferring said material from one case section to the other.

References Cited

UNITED STATES PATENTS

| | | | |
|---|---|---|---|
| 1,087,336 | 2/1914 | Thurber | 40—102 |
| 2,377,397 | 6/1945 | Booth | 85—41 |
| 2,779,116 | 1/1957 | Smith | 40—106.1 |
| 3,246,411 | 4/1966 | Aafedt | 40—106 |

FOREIGN PATENTS 18,931   8/1907   Great Britain.

EUGENE R. CAPOZIO, *Primary Examiner.*

W. J. CONTRERAS, *Assistant Examiner.*